OR 3,817,598

United States
Taylor 3,817,598
June 18, 1974

[54] LASER BEAM DEFLECTION SYSTEM
[75] Inventor: Henry F. Taylor, San Diego, Calif.
[73] Assignee: The United States of America as represented by the Secretary of the Navy, Washington, D.C.
[22] Filed: Sept. 25, 1972
[21] Appl. No.: 292,034

[52] U.S. Cl. .................. 350/160 R, 331/94.5 K
[51] Int. Cl. ............................................. G02f 1/02
[58] Field of Search ............... 350/160 R, 286, 149; 331/94.5 K, 94.5 C, 94.5 S, 94.5 M; 356/98

[56] References Cited
UNITED STATES PATENTS

| | | | |
|---|---|---|---|
| 2,330,694 | 9/1943 | Estey et al. | 356/98 |
| 2,408,512 | 10/1946 | Gradisar | 356/98 X |
| 3,403,348 | 9/1968 | Ashkin et al. | 331/94.5 C X |
| 3,487,327 | 12/1969 | Clark | 331/94.5 S |
| 3,492,600 | 1/1970 | Zitter | 331/94.5 K X |
| 3,509,489 | 4/1970 | Burns et al. | 331/94.5 K |
| 3,578,866 | 5/1971 | Kohler | 356/98 X |
| 3,621,459 | 11/1971 | Reeves | 350/160 R X |
| 3,667,038 | 5/1972 | Cutler et al. | 350/149 X |

OTHER PUBLICATIONS
"Electronic Tuning of a Dye Laser Using the Acousto-Optic Filter," by Taylor, D. J. et al., App. Phys. Ltrs., Vol. 19, No. 8, October 1971, pgs. 269–271.

Primary Examiner—Ronald L. Wibert
Assistant Examiner—Paul K. Godwin
Attorney, Agent, or Firm—R. S. Sciascia; G. J. Rubens; J. W. McLaren

[57] ABSTRACT

A source of laser energy of determinable, relatively narrow band spectral character, includes means for selectively changing the spectral character of the laser energy, preferably by filtering, so as to produce a desired very narrow-band spectral output. The laser energy is intercepted by means for both expanding it into a beam of desired dimension, and also collimating the beam; dispersing means positioned to receive the collimated beam causes the emerging laser energy to be dispersed at different angular dispositions as a function of the variation in its principal wavelength component. Means for focusing the laser energy at a selected image plane are provided whereby the selective changing of the spectral character of the beam and its principal wavelength component is determinative of the spatial disposition of the laser energy focused at the image plane. Thus, the position of the focused principal wavelength component may be changed to any one of a great number of possible positions by selectively changing the spectral character of the laser energy.

5 Claims, 3 Drawing Figures

LASER BEAM DEFLECTION SYSTEM

BACKGROUND OF THE INVENTION

Known optical memories and many other conventional electro-optic systems of similar type may be severely limited in their performance by the inherent limitations of beam deflection systems which they employ. In present day, known optical memory systems, beam deflection may be accomplished by acousto-optic, electro-optic, or mechanical devices and methods. Acousto-optic and electro-optic techniques may be devised to provide high-speed performance of the order of approximately $10^{-4}$ to $10^{-6}$ second response as well as random access; however, such systems are severely limited, on the other hand, as to the number of different positions to which a beam of light can be reliably and repeatedly deflected as desired.

Unfortunately, mechanical devices are relatively slow in operation so that they do not offer high speed, nor in many cases, the very desirable advantage of random access. Moreover, mechanical components are most suceptible to problems of wear and require constant lubrication and maintenance. Accordingly, it is most desirable that a laser beam deflection system be provided which combines high speed response, random access, and affords a large number of possible positions to which the beam can be reliably, repeatedly, deflected by the selection of any one desired position.

SUMMARY OF THE INVENTION

The present invention is a high speed multi-positional, laser beam deflection system of unique concept which employs a source of laser energy, preferably of determinable narrow-band spectral character. The source of laser energy includes means for selectively changing the spectral character of the laser energy, preferably by an appropriate effective technique which provides an extremely narrow-band spectral region in the selected wavelength range and is continuously tunable throughout a relatively broad range. The selected narrow-band region is intercepted and expanded into a collimated beam of desired dimension.

Dispersion means is positioned to receive the collimated beam and cause the emerging laser energy to be dispersed at different angular dispositions as a function of the principal wavelength component of the laser beam. A means is provided for focusing the laser energy at a selected image plane whereby the selective changing of the spectral character of the beam to a chosen narrow-band spectral region is determinative of the spatial disposition of the principal wavelength component focused at the image plane, which spatial disposition is repeatedly and reliably characteristic of each selected narrow-band spectral region and its principal wavelength component.

Accordingly, the selective change of the spectral character of the laser energy, particularly within a desired very narrow-band, spectral region as previously mentioned, is the method and technique for directing laser energy to a particular desired point in the image plane. The laser beam can be controlled by a continuously tunable selective filtering means, for example, to direct the focused laser energy at a desired, particular point for purposes of reading into, or reading out of, an optical memory, for example. If an acousto-optic crystal is employed as the filtering means which selectively changes the spectral character of the laser energy, the system provides the combined advantages of extremely high speed operation, random access, continuous tunability in response to changes in the frequency of applied acoustic energy, and a very large number of beam positions to which the laser energy may be selectively directed.

If a diffraction grating is employed to resolve wavelength differences into separate beam positions, the optical relationship may be expressed by the equation:

$$\Delta\lambda/\lambda = 1/mN$$

where $\lambda$ is the optical wavelength, $\Delta\lambda$ is the change in wavelength which can be resolved, $m$ is the diffraction order, and $N$ is the number of lines in the grating. For example, if it is assumed that $N=10,000$ and $m=1$, $\Delta\lambda/\lambda = 10^{-4}$. Assuming a wavelength where $\lambda$ equals 6,000A, $\Delta\lambda = 0.6A$. If it is further assumed that the output of the laser is tunable from 5,700A to 6,300A by changing the acoustic frequency applied to the acousto-optic crystal, then the deflector would be capable of providing one thousand different reliably resolvable positions.

In accordance with the concept of the present invention, any suitable source of laser energy may be provided, though it has been found that in many applications a liquid dye laser solution is highly desirable.

Additionally, several different types of means may be employed for selectively changing the spectral character of the laser energy to provide a tunable, extremely narrow-band spectral region of such laser energy. For example, an acousto-optic crystal has many desirable aspects and features. However, it has been found that diffraction gratings used as cavity reflectors may also be employed effectively to produce efficient spectral narrowing and continuous tunability in dye lasers over a span of bandwidth which is large compared to the ordinary lasing action.

Additionally, an electro-optic type of technique may be employed to selectively change the spectral output of laser energy by the use of a relatively simple birefringent filter inserted into the laser cavity and operative under the control of an appropriate applied potential which tunes the filter over a relatively broad bandwidth.

Thus, upon a more complete understanding of the concept and teaching of the present invention those knowledgeable in the pertinent arts will readily appreciate that the present invention is not limited to any one particular method or device for continuously tuning the laser energy of a suitable source through a range of selectable, relatively very narrow, spectral bandwidths. The concept of the present invention is such that any suitable, desirable method or means of continuously tuning a selectively determinable narrow bandwidth of laser energies may be employed including those methods, means, techniques, and devices which may as yet be unknown generally in the art, or not as yet perfected to the point of reliable operation. Such techniques may involve electrostatic, electromagnetic or comparable phenomena applied in combination with the generation of laser energy.

Additionally, it should be borne in mind that while it has been found that liquid dye lasers are desirable in many applications of the present invention, the inventive concept is not so limited and may be advantageously employed through the use of any suitable source of laser energy.

Accordingly, it is a primary object of the present invention to provide a high speed, multi-positional laser beam deflection system overcoming many of the disadvantages of comparable prior art systems.

An equally important object of the present invention is to provide such a high speed, multi-positional laser beam deflection system which affords a greater number of positions to which the laser beam may be selectively, and reliably deflected than was possible with many prior art systems.

A further important object of the present invention is to provide such a high speed, multi-positional laser beam deflection system which does not relay on mechanical devices for its operation.

Another important object of the present invention is to provide a high speed, multi-positional laser beam deflection system which has extremely high speed response.

Yet a further object of the present invention is to provide a high speed, multi-positional laser beam deflection system which has a very high order of reliability in its operation.

Yet a further important object of the present invention is to provide a high speed, multi-positional laser beam deflection system which is so conceived as to insure a very high degree of repeatability in its operation of directing a laser beam to any one selected position of a great multitude of such positions.

These and other features, objects, and advantages of the present invention will be better appreciated from an understanding of the operative principles of a preferred embodiment as described hereinafter and as illustrated in the accompanying drawings.

DESCRIPTION OF THE PREFERRED EMBODIMENTS

Figure 1:
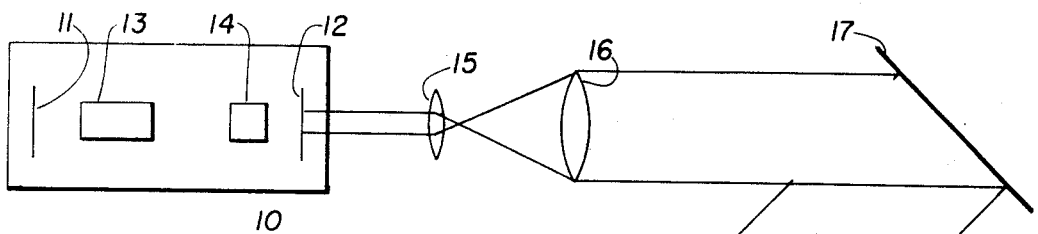
FIG. 1 is a schematic representation of a preferred embodiment of the present invention.
Figure 2:
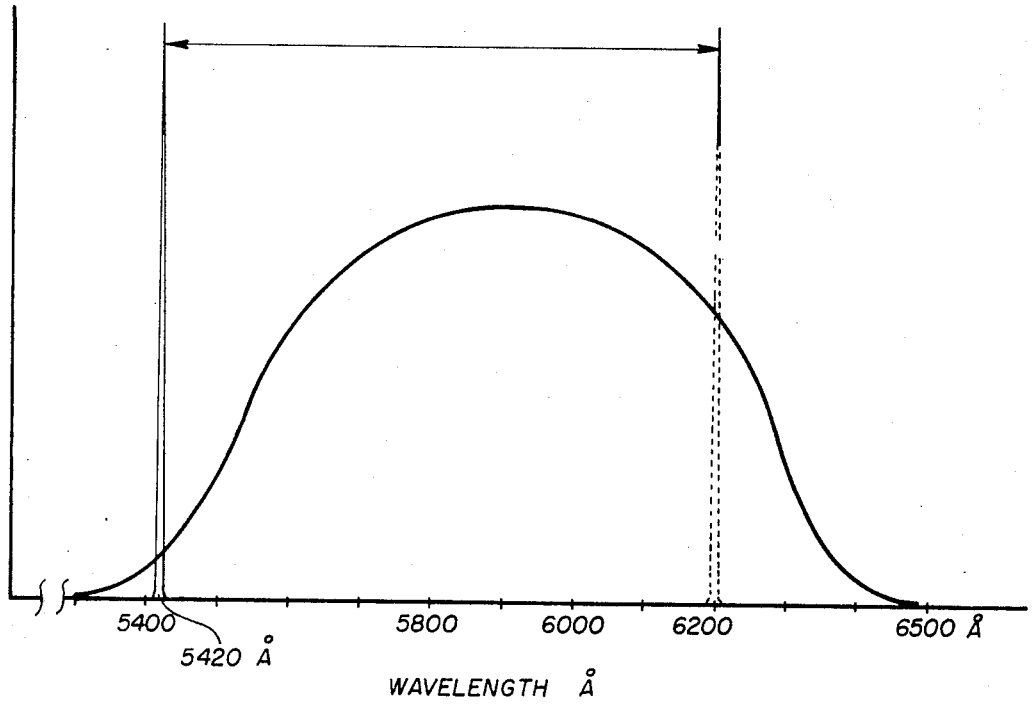
FIG. 2 is a graphical illustration of a typical operation of an acousto-optic filter employed for continuously tuning laser energy emitted from a dye laser material to provide an output of any selected very narrow spectral region over a relatively broad spectral bandwidth.

FIG. 1 is a schematic representation illustrating the elements and components of one preferred embodiment of the present invention. As shown in FIG. 1, a laser cavity 10 is provided as a source of laser energy having a determinable and preferably narrow band spectral character. The spectral characteristics of one type of source of laser energy which may be advantageously employed within the concept of the present invention are illustrated in FIG. 2 which will be explained more extensively hereinafter.

Two reflective elements 11 and 12, respectively, are positioned at opposite ends of the laser cavity 10 to perform a multi-reflection function traversing the path between the reflective elements 11 and 12. That path also includes a laser cell 13 which contains an appropriate material capable of lasing action such as a dye laser material in solution, for example. Additionally, a tunable filter 14 is positioned in the same path between the two reflective elements 11 and 12 and performs the function of changing the spectral character of the laser energy emitted by the laser cell 13 to provide a much narrower spectral band of laser energy which is tunable throughout a significant portion of the bandwidth of laser energy initially generated by the laser cell 13.

The tunable filter 14 may, for instance, be of the acousto-optic crystal type and is positioned and supported within the laser cell 10 so as to receive the laser energy emitted by the laser cell 13. A source of acoustic energy which is selectively variable in frequency is impressed upon the acousto-optic crystal type of tunable filter 14 and in accordance with known phenomena performs the function of filtering all but a very narrow spectral band of the laser energy from the laser cell 13, which very small spectral region of laser energy is selectively variable in response to the particular acoustic frequency applied to the acousto-optic crystal type of tunable filter 14. Thus, the frequency of the laser energy emergent from the laser cavity 10 is selectively changeable and variable within a substantial range of bandwidths in accordance with a commensurately selectively variable source of acoustic energy which is applied to the acousto-optic crystal type tunable filter 14.

The reflective element 12 is conceived, arranged and designed to be only partially reflective for the purpose of permitting the passage of laser energy therethrough and accordingly the selectively tunable very narrow band spectral region of laser energy emerges through the partially reflective element 12. The laser energy is received by an appropriate optical element 15 which, together with the optical element 16, expands the beam dimensionally to provide a collimated beam of laser energy of a desired cross-sectional size. The collimated beam of laser energy of selectively tunable narrowband spectral character is then directed to an appropriate dispersion means 17 which spatially disperses the collimated beam of very narrow spectral character in accordance with its principal or dominant wavelength component.

In one preferred embodiment of the present invention such as that illustrated in FIG. 1, the dispersive means 17 may take the form of a diffraction grating and, in accordance with well known phenomena, as the principal wavelength component of the collimated beam impinging upon the dispersive diffraction grating 17 in selectively and controllably changed, the laser energy is dispersed at different angular dispositions as a function of the variation in wavelength of the beam's principal component. Thus, the laser energy is dispersed angularly in accordance with the changes in wavelength of the principal or dominant component within its very narrow overall spectral bandwidth.

An appropriate optical element, such as the lens 18, receives the dispersed laser energy from the dispersive element 17 and functions to focus the laser energy at a selected image plane 19. Each different wavelength has a commensurately different spatial and angular disposition which is a function of each particular wavelength and therefore any change in the principal wavelength component of the collimated beam incident upon the dispersive element 17 brings about a different spatial disposition of the laser energy focused at the image plane 19.

Accordingly, the filtering means 14 which selectively tunes the wavelength content of the laser energy output generated in laser cavity 10 in response to an applied acoustic energy of selectively variable frequency controls the spatial disposition of the focused spot of laser energy at the image plane 19. Thus, the focused laser energy may be spatially controlled by the selective application of acoustic energy of variable frequency.

Figure 1A:
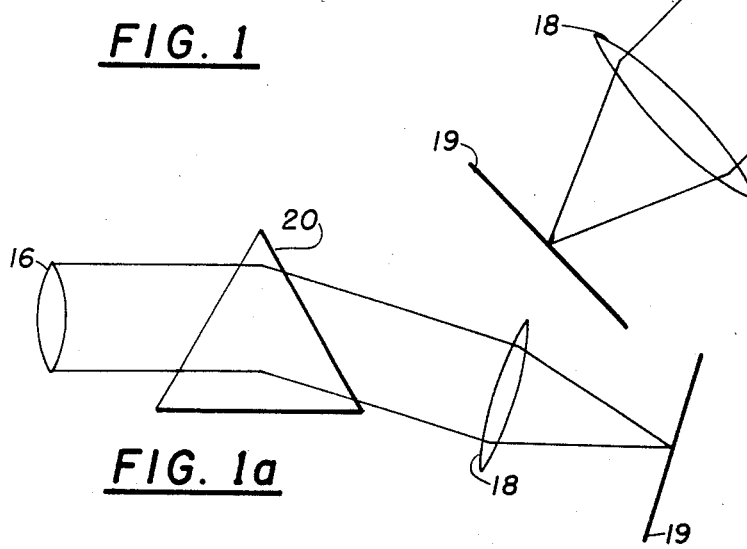
FIG. 1a is a schematic representation of a variant embodiment of the present invention illustrating the use of an alternate dispersive means in the form of a prism.

FIG. 1a illustrates a variant embodiment of the present invention wherein a suitable source of laser energy, such as that illustrated in FIG. 1, includes a means for selectively changing the spectral character of the emergent laser energy. The laser energy is formed into a beam of desired dimension and also collimated in the manner illustrated in FIG. 1. The collimated beam is then directed to a dispersive means which takes the form of a prism 20. The prism 20 disperses the collimated beam of laser energy at different angular dispositions commensurate with the variation in its principal wavelength component and, in a manner similar to that previously described in connection with FIG. 1, an appropriate optical element 18 focuses the dispersed laser energy at an image plane 19. It is to be understood that the concept of the present invention is not limited to any one dispersive means but any appropriate means which performs the function of dispersing the varying principal wavelength component within a very narrow band spectral region of laser energy at different spatial positions as a function of variation in wavelength may be advantageously employed.

FIG. 2 graphically illustrates the spectral characteristics of a typical source of laser energy which may be advantageously employed in accordance with the concept of the present invention and also shows the manner and the typical span of bandwidth over which an acoustical optic filter may be used to provide the desired selective tuning capability in a preferred embodiment of the present invention. Employing the dye Rhodamine 5G, $10^{-4}$M in ethanol, a dye laser may be successfully tuned from 5,445A to 6,225A, by varying an applied acoustic frequency from 58.2 MHz to 45.0 MHz. An acousto-optic filter of the $CaMoO_4$ type affords tuning over approximately 780A for producing a lasing line output of the filter of approximately 1.35A in width.

As is well known in the art the acousto-optic filter utilizes a collinear interaction between an ordinary optical wave, and extraordinary optical wave, and a traveling acoustic wave in birefringent crystal. On a microscopic basis, the acoustic wave couples light of one polarization into the orthogonal polarization. In order for this coupling to be cumulative, the optical and acoustic waves must satisfy the phase matching condition. Changing the acoustic control frequency selects the narrow band of optical frequency that is efficiency diffracted into the orthogonal polarization. In a $CaMoO_4$ filter which may be employed with the preferred embodiment of present invention, essentially 100% conversion may be obtained with an acoustic power density of $150 mW/mn^2$ at 5800A.

The extremely narrow-band output of 1.35A width appears as a line in in the scale of the drawing of FIG. 2 as shown at approximately 5445A. By continuously changing the frequency of the applied acoustic energy, filtering may be achieved through a continuous spectral range to approximately 6,225A as represented by the line at the right-hand side of FIG. 2, indicating a spectral output of approximately 1.35A.

Thus, it may be seen by those skilled and knowledgeable in the pertinent arts, that the present invention conceives a unique combination of elements providing a laser beam deflection system which will give extremely high speed operation, provides random access, and can be so designed as to operate reliably, effectively, and with a high degree of repeatability in directing a laser beam to a focused spot at any one of the great multitude of positions as determined by the continuously tunable frequency of an input signal. As the frequency of the input signal is changed, the system responds to direct the focused spot to a different selectively determined spatial disposition which may be employed, for example, either to read information into an optical memory, or to read information out of an optical memory. It should be borne in mind, however, that the inventive concept of the present system is broadly directed to a laser beam deflection system and is not limited to its employment with an optical memory.

Since all components of the present invention are non-mechanical, high speed devices, the present invention is an extremely high speed device in its response.

Additionally, it should be appreciated that the concept of the present invention is such that any suitable component such as an original source of energy, or a tuning means in the form of a filter, or other element may be selected to be employed within the teaching and spirit of the present invention and that the present invention is not limited to any particular type of source of laser energy, nor to any particular technique or means of tuning that source continuously to provide a selectively determined narrow-band spectral output in accordance with the teaching of the present invention.

Obviously many modifications and variations of the present invention are possible in the light of the above teachings. It is therefore to be understood that within the scope of the appended claims the invention may be practiced otherwise than as specifically described.

What is claimed is:

1. A high-speed, multipositional laser beam deflection system comprising:
   a laser assembly;
   a source of laser energy contained within said laser assembly;
   an acousto-optic filter disposed relative to said source for selectively tuning the laser energy emitted from said assembly through a continuous range of determinable, narrow-band, spectral character;
   means intercepting said laser energy for expanding it into a collimated beam of desired dimension;
   dispersion means positioned to receive said collimated beam and cause the emerging laser energy of the beam to be dispersed at different angular dispositions as a function of the principal wavelength component of said beam; and
   means for focusing the laser energy of said beam at a selected image plane, whereby the selective changing of the spectral character of said beam is determinative of the spatial disposition of the laser energy focused at said image plane.

2. A laser beam deflection system as claimed in claim 1 wherein said source of laser energy is a liquid dye laser.

3. A laser beam deflection system as claimed in claim 1 wherein said dispersion means is a diffraction grating.

4. A laser beam deflection system as claimed in claim 1 wherein said dispersion means is a prism.

5. A laser beam deflection system as claimed in claim 1 wherein said prism is of a material having minimum absorption of the wavelength components of said spectral character.

* * * * *